US012673613B2

(12) United States Patent
Wakayama et al.

(10) Patent No.: US 12,673,613 B2
(45) Date of Patent: Jul. 7, 2026

(54) RETROFIT VISION ASSIST WITH MONOCULAR DEPTH ESTIMATION

(71) Applicant: Toyota Research Institute, Inc., Los Altos, CA (US)

(72) Inventors: Yuki Wakayama, Mountain View, CA (US); Erin A McColl, Los Gatos, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 77 days.

(21) Appl. No.: 18/595,552

(22) Filed: Mar. 5, 2024

(65) Prior Publication Data

US 2025/0282288 A1 Sep. 11, 2025

(51) Int. Cl.
| | |
|---|---|
| *B60R 1/23* | (2022.01) |
| *B60Q 9/00* | (2006.01) |
| *G06T 7/50* | (2017.01) |
| *G06T 7/73* | (2017.01) |
| *G06T 7/80* | (2017.01) |

(Continued)

(52) U.S. Cl.
CPC ............... *B60R 1/23* (2022.01); *B60Q 9/008* (2013.01); *G06T 7/50* (2017.01); *G06T 7/73* (2017.01); *G06T 7/80* (2017.01); *G06T 19/20* (2013.01); *G06V 20/56* (2022.01); *B60R 2300/10* (2013.01); *B60R 2300/307* (2013.01); *B60R 2300/8093* (2013.01); *G06T 2200/04* (2013.01);

(Continued)

(58) Field of Classification Search
CPC . B60R 1/23; B60R 2300/10; B60R 2300/307;

B60R 2300/8093; B60Q 9/008; G06T 7/50; G06T 7/73; G06T 7/80; G06T 19/20; G06T 2200/04; G06T 2207/10028; G06T 2207/30252; G06T 2219/2012; G06V 20/56
See application file for complete search history.

(56) References Cited

U.S. PATENT DOCUMENTS

| | | | |
|---|---|---|---|
| 6,222,447 | B1 | 4/2001 | Schofield et al. |
| 9,637,051 | B2 | 5/2017 | Dayan et al. |

(Continued)

OTHER PUBLICATIONS

Denso, "Back camera linked ultrasonic sonar system," Retrieved from the Internet: <https://www.denso-solution.com/original/products/back-sonar/>, retrieved Oct. 27, 2023 (5 pages).

*Primary Examiner* — Anne Marie Antonucci
*Assistant Examiner* — Misa H Nguyen
(74) *Attorney, Agent, or Firm* — Christopher G. Darrow; Darrow Mustafa PC

(57) ABSTRACT

Systems, methods, and other embodiments described herein relate to retrofit vision assist systems for vehicles based on monocular depth estimation. In one embodiment, a method for operating a depth system of a vehicle includes acquiring a camera image from a monocular camera that is retrofitted to a vehicle. The method also includes estimating depth information of features in the camera image to output a depth map including three-dimensional data associated with the camera image. The method also includes generating an annotated image based on the three-dimensional data. The method further includes displaying the annotated image to aid a driver in understanding a surrounding environment of the vehicle.

14 Claims, 10 Drawing Sheets

(51) Int. Cl.
    *G06T 19/20*         (2011.01)
    *G06V 20/56*         (2022.01)

(52) U.S. Cl.
    CPC .............. *G06T 2207/10028* (2013.01); *G06T 2207/30252* (2013.01); *G06T 2219/2012* (2013.01)

(56)            References Cited

U.S. PATENT DOCUMENTS

| | | |
|---|---|---|
| 11,030,476 B2 | 6/2021 | Xu et al. |
| 11,145,074 B2 | 10/2021 | Guizilini et al. |
| 2013/0154816 A1* | 6/2013 | Giesler .................. B60Q 9/005<br>340/438 |
| 2020/0104612 A1 | 4/2020 | Chen et al. |
| 2021/0370828 A1* | 12/2021 | Galluzzi ................. H04N 5/44 |
| 2022/0084230 A1* | 3/2022 | Guizilini ................... G06T 3/18 |
| 2022/0219607 A1* | 7/2022 | Freeman-Powell ... B60W 50/14 |
| 2022/0289239 A1* | 9/2022 | Shenfeld ................ G01C 21/30 |
| 2023/0029900 A1* | 2/2023 | Goel ................... G06V 20/647 |
| 2024/0005632 A1* | 1/2024 | Ko ........................... G06T 7/70 |
| 2024/0371036 A1* | 11/2024 | Jeon .......................... G06T 7/50 |
| 2025/0166216 A1* | 5/2025 | Ravi Kumar ......... G06V 10/56 |

* cited by examiner

126

300

RETROFIT VISION ASSIST WITH MONOCULAR DEPTH ESTIMATION

TECHNICAL FIELD

The subject matter described herein relates, in general, to vision assist systems for vehicles and, more particularly, to retrofit vision assist systems for vehicles based on monocular depth estimation.

BACKGROUND

When operating vehicles, users benefit from awareness of the surrounding environment of the vehicle, especially information regarding nearby vehicles, obstacles, pedestrians, etc. Some vehicles include rearview and/or sideview mirrors for providing visibility of areas proximate the vehicle. However, in some instances, mirrors do not provide a user with a comprehensive understanding of the vehicle's environment, as mirrors only provide users with limited views of these areas. Some vehicles also include ultrasonic sensors, radars, and/or camera systems that provide a user with information about the environment of the vehicle. However, these technologies are limited to installation during manufacturing, thereby leaving vehicles without these systems with limited tools for improving the awareness of an operator.

SUMMARY

In one embodiment, example systems and methods relate to a manner of improving vision assist systems for vehicles. As mentioned above, some vehicular vision assist systems, such as rearview and/or sideview mirrors and ultrasonic sensors and radar systems, often do not provide a comprehensive understanding of a vehicle's environment. Moreover, these technologies are limited to installation during manufacturing, thereby leaving vehicles without these systems with limited tools for improving the operator's awareness of the vehicle's environment. Accordingly, in at least one arrangement, a depth system is disclosed that implements a novel approach to providing a retrofitted vision assist system in a vehicle that leverages monocular depth estimation, thereby improving the implementation of vision assist systems in vehicles.

For example, in one approach, the depth system leverages monocular depth estimation according to a single monocular camera that may be retrofitted to a vehicle. In one arrangement, the depth system acquires an original camera image from the camera and performs monocular depth estimation on the camera image to output a depth map based on the camera image. In one instance, the depth map provides a pixel-wise estimation of three-dimensional data associated with the original image, such as depth values, within a scene depicted by the image. This includes distances from the camera to various features depicted in the image, such as vehicles, buildings, road surfaces, trees, people, and so on. In general, the depth map provides depth information at a granularity of the pixel. Accordingly, the depth map includes corresponding depth values for separate pixels in the image. As such, the level of detail in the depth map relates to the resolution of the original image.

In order to provide richer information to a vehicle operator, in one approach, the depth system generates an annotated image based on the depth map and the camera image. The annotated image is, in one approach, a version of the camera image that shows the three-dimensional data (i.e., distance values) related to the depth map. The annotated image, when viewed by an operator of the vehicle, enables the operator to readily perceive objects in the field-of-view of the camera and understand their distances to the vehicle. Accordingly, the annotated image aids the operator in understanding an external environment of the vehicle.

In one approach, the depth system generates the annotated image by colorizing objects in the image according to their distances to the camera as defined by the depth map. In another approach, the depth system generates the annotated image by colorizing objects in the image according to a risk of impact between the vehicle and the objects. The risk of impact, in one example, is calculated based on travel information of the vehicle, which may include a location, a speed, an acceleration, and/or a heading of the vehicle relative to 3D locations in the environment of the objects derived from the depth map. In other approaches, objects can be colorized in the annotated image when they are within a distance threshold to the vehicle.

Accordingly, the embodiments described herein provide the advantage of leveraging the lightweight nature of monocular depth estimation according to a single camera to estimate depth information of features in a surrounding environment of a vehicle. The approaches described herein thereby provide a less complex and cheaper vision assist system that provides an operator of a vehicle with information regarding the surrounding environment of the vehicle. In any case, the information acquired from monocular depth estimation is much richer than that provided by ultrasonic sensors, thereby providing an operator of a vehicle with much more detailed information about features in the surrounding environment of the vehicle.

In one embodiment, a depth system for a vehicle is disclosed. The depth system includes a processor and a memory communicably coupled to the processor. The memory stores a depth module including instructions that when executed by the processor cause the processor to acquire a camera image from a monocular camera that is retrofitted to a vehicle. The instructions also include instructions to estimate depth information of features in the camera image to output a depth map including three-dimensional data associated with the camera image. The instructions further include instructions to generate an annotated image based on the three-dimensional data. The instructions further include instructions to display the annotated image to aid a driver in understanding a surrounding environment of the vehicle.

In one embodiment, a non-transitory computer-readable medium for a depth system for a vehicle is disclosed. The non-transitory computer-readable medium includes instructions that when executed by a processor cause the processor to perform one or more functions. The instructions include instructions to acquire a camera image from a monocular camera that is retrofitted to a vehicle. The instructions also include instructions to estimate depth information of features in the camera image to output a depth map including three-dimensional data associated with the camera image. The instructions also include instructions to generate an annotated image based on the three-dimensional data. The instructions further include instructions to display the annotated image to aid a driver in understanding a surrounding environment of the vehicle.

In one embodiment, a method for operating a depth system of a vehicle is disclosed. In one embodiment, the method includes acquiring a camera image from a monocular camera that is retrofitted to a vehicle. The method also includes estimating depth information of features in the camera image to output a depth map including three-dimensional data associated with the camera image. The method also includes generating an annotated image based on the three-dimensional data. The method further includes displaying the annotated image to aid a driver in understanding a surrounding environment of the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving vision assist systems are disclosed herein. As previously noted, typical vehicular vision assist systems often do not provide a comprehensive understanding of a vehicle's environment. Moreover, these technologies can be limited to installation during manufacturing. Accordingly, in at least one arrangement, a depth system is disclosed that implements a novel retrofitted vehicular vision assist system based on monocular depth estimation, thereby improving vision assist systems in vehicles.

For example, in one approach, the depth system leverages monocular depth estimation according to a single monocular camera retrofitted to a vehicle. In one arrangement, the depth system acquires an original image from the camera and performs monocular depth estimation on the camera image to output a depth map. In one instance, the depth map provides a pixel-wise estimation of three-dimensional data associated with the original image, such as depth values, within a scene depicted by the image. This includes distances from the camera to various features depicted in the image. In general, the depth map provides depth information at a granularity of the pixel and includes corresponding depth values for separate pixels in the image.

In one approach, the depth system generates an annotated image based on the depth map and the camera image. The annotated image is, in one approach, the camera image that is overlaid with the three-dimensional data related to the depth map. The annotated image, when viewed by an operator of the vehicle, enables the operator to readily understand an external environment of the vehicle.

In one approach, the depth system generates the annotated image by colorizing objects in the image according to their distances to the camera. In another approach, the depth system generates the annotated image by colorizing objects in the image according to a risk of impact between the vehicle and the objects. The risk of impact, in one example, is calculated based on travel information of the vehicle, which may include a location, a speed, an acceleration, and/or a heading of the vehicle. In other approaches, objects can be colorized in the annotated image when they are within a distance threshold to the vehicle. Accordingly, the embodiments described herein provide the advantage of leveraging the lightweight nature of monocular depth estimation according to a single camera to estimate depth information of features in a surrounding environment of a vehicle.

Figure 1:
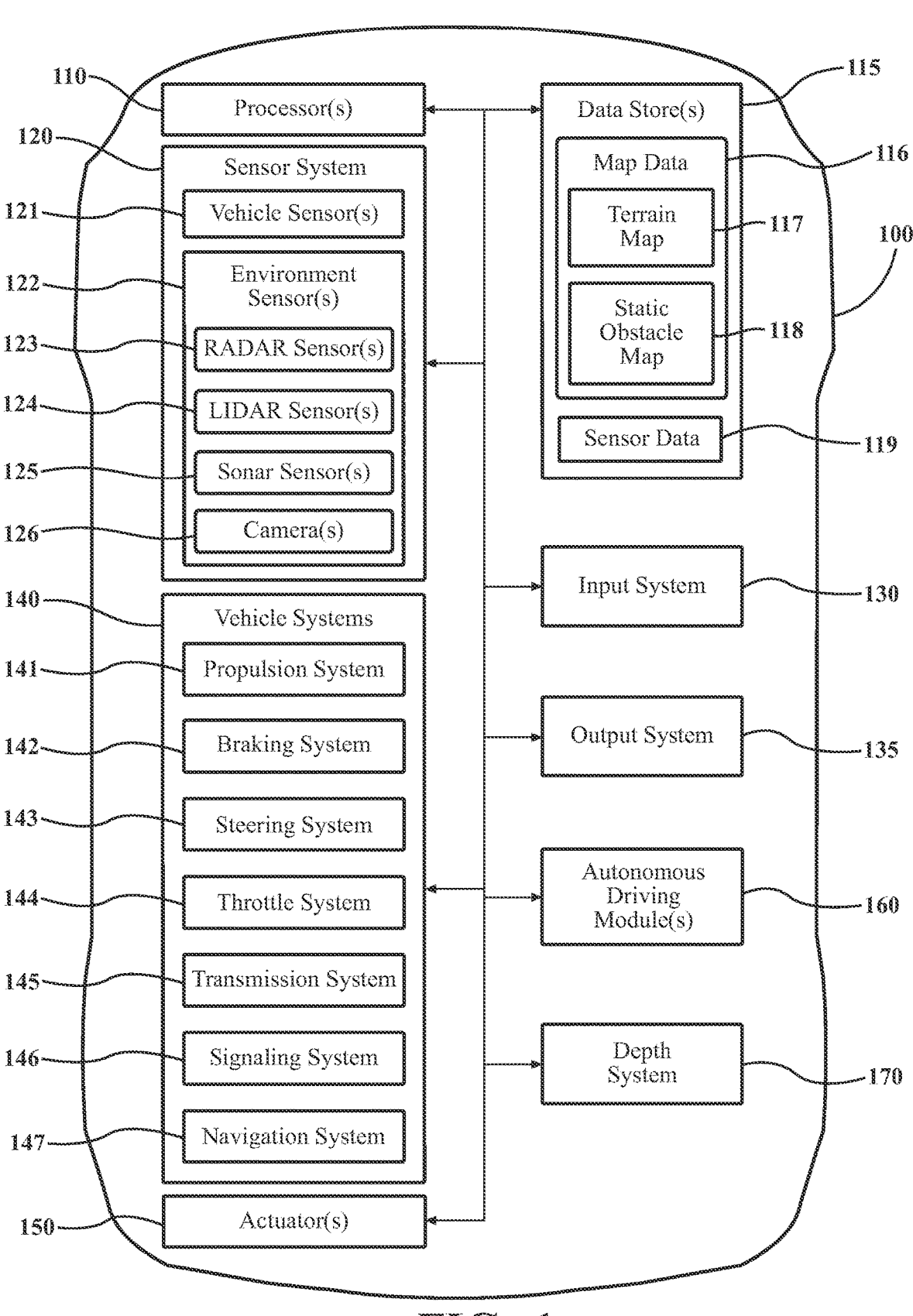
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be another form of motorized transport that may be human-operated or otherwise interface with human passengers. In another aspect, the vehicle 100 includes, for example, sensors to perceive aspects of the surrounding environment, and thus benefits from the functionality discussed herein associated with depth systems.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes a depth system 170 that is implemented to perform methods and other functions as disclosed herein relating to improving vision assist systems for vehicles. More specifically, in one approach, the depth system 170 functions to train and implement a model to process monocular images and provide depth estimates for an environment (e.g., objects, surfaces, etc.) depicted therein. As will be discussed in greater detail subsequently, the depth system 170, in various embodiments, is implemented partially within the vehicle 100, and as a cloud-based service. For example, in one approach, functionality associated with at least one module of the depth system 170 is implemented within the vehicle 100 while further functionality is implemented within a cloud-based computing system.

Figure 2:
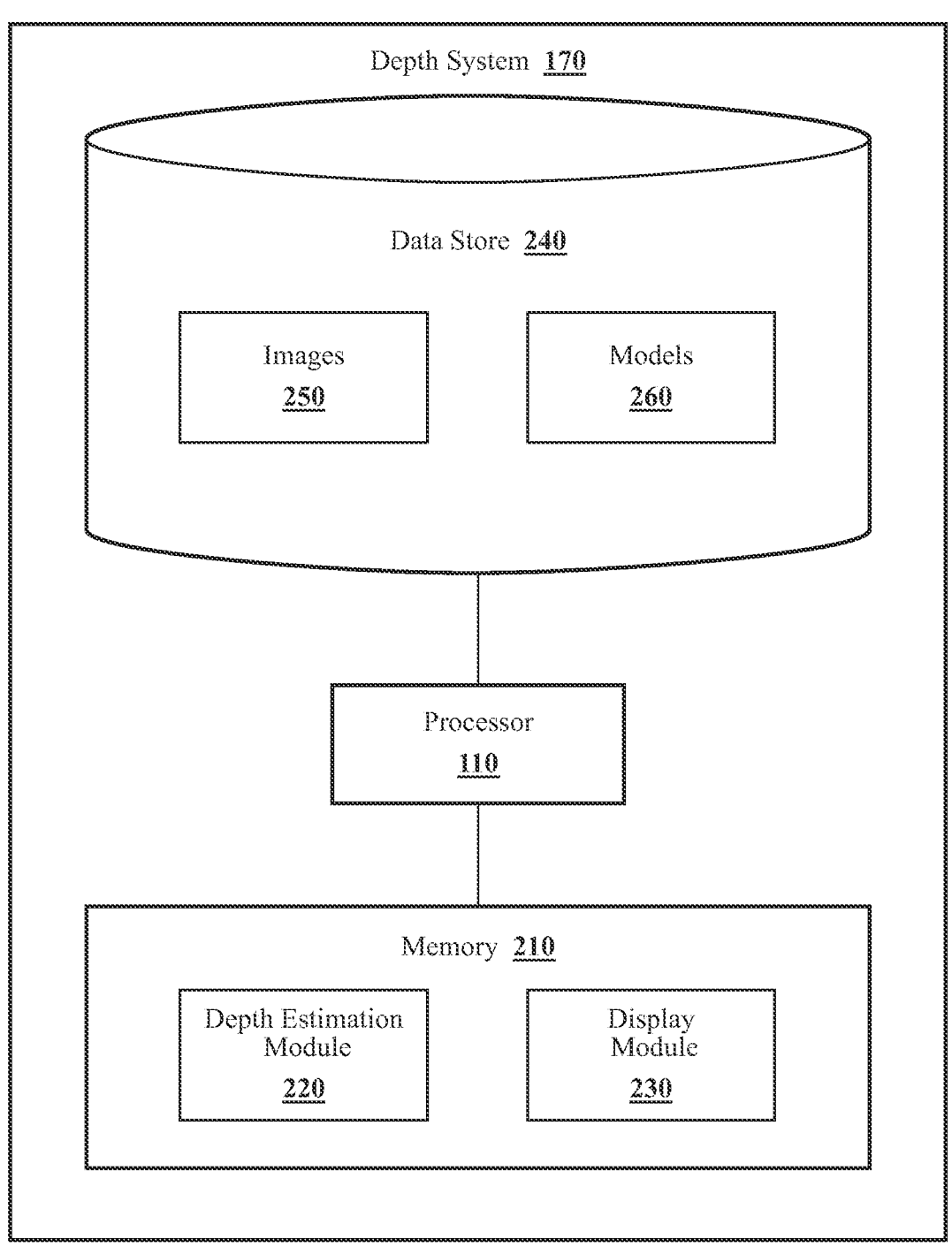
FIG. 2 illustrates one embodiment of a depth system that is associated with the vehicle of FIG. 1.

With reference to FIG. 2, one embodiment of the depth system 170 of FIG. 1 is further illustrated. The depth system 170 is shown as including a processor 110 from the vehicle 100 of FIG. 1. Accordingly, the processor 110 may be a part of the depth system 170, the depth system 170 may include a separate processor from the processor 110 of the vehicle 100, or the depth system 170 may access the processor 110 through a data bus or another communication path. In one or more embodiments, the processor 110 is an application-specific integrated circuit (ASIC) that is configured to implement functions associated with a depth estimation module 220 and a display module 230. In general, the processor 110 is an electronic processor, such as a microprocessor, that is capable of performing various functions, as described herein.

In one embodiment, the depth system 170 includes a memory 210 that stores the depth estimation module 220 and the display module 230. The memory 210 is a random-access memory (RAM), read-only memory (ROM), a hard-disk drive, a flash memory, or other suitable memory for storing the depth estimation module 220 and the display module 230. The depth estimation module 220 and the display module 230 are, for example, computer-readable instructions that when executed by the processor 110 cause the processor 110 to perform the various functions disclosed herein.

Furthermore, in one embodiment, the depth system 170 includes a data store 240. The data store 240 is, in one embodiment, an electronic data structure, such as a database, that is stored in the memory 210 or another memory, and that is configured with routines that can be executed by the processor 110 for analyzing stored data, providing stored data, organizing stored data, and so on. Thus, in one embodiment, the data store 240 stores data used by the depth estimation module 220 and/or the display module 230 in executing various functions. In one embodiment, the data store 240 includes images 250 and models 260, which may include a depth model, and/or a semantic model, along with, for example, other information that is used by the depth estimation module 220 and/or the display module 230.

It should be appreciated that the models 260 are, for example, machine learning models. As such, the depth system 170 or another system functions to train the models 260 using training data. The training data generally includes one or more monocular videos to train the depth model. The videos are comprised of a plurality of frames in the form of the images 250 that are monocular images. Of course, the images 250 may alternatively be input images for use during inference by the depth model. That is, in relation to the models 260, it should be noted that the models 260 are first trained on a particular task (e.g., monocular depth estimation) as a pre-configuration step and then used during inference to perform the task. Accordingly, the form of the input data may vary according to the type of training as compared to inference.

In any case, as described herein, a monocular image is, for example, an image from the camera 126, or another monocular camera, that may be part of a video, and that encompasses a field-of-view (FOV) about the vehicle 100 of at least a portion of the surrounding environment. That is, the monocular image is, in one approach, generally limited to a subregion of the surrounding environment. As such, the image may be of a forward-facing (i.e., the direction of travel) 60, 90, 120-degree FOV, a rear/side facing FOV, or some other subregion as defined by the characteristics of the camera 126.

In some arrangements, one or more monocular camera(s) 126 are retrofitted to the vehicle 100. "Retrofitted," as used herein, indicates that the camera(s) 126 are installed to the vehicle 100 after manufacture of the vehicle 100. In other words, the retrofitted camera(s) 126 are part of an after-market vision assist system for the vehicle 100. For example, the camera(s) 126 can be retrofitted to a vehicle that was not originally manufactured with a vision assist system, for example, without a backup camera.

Figure 3A:
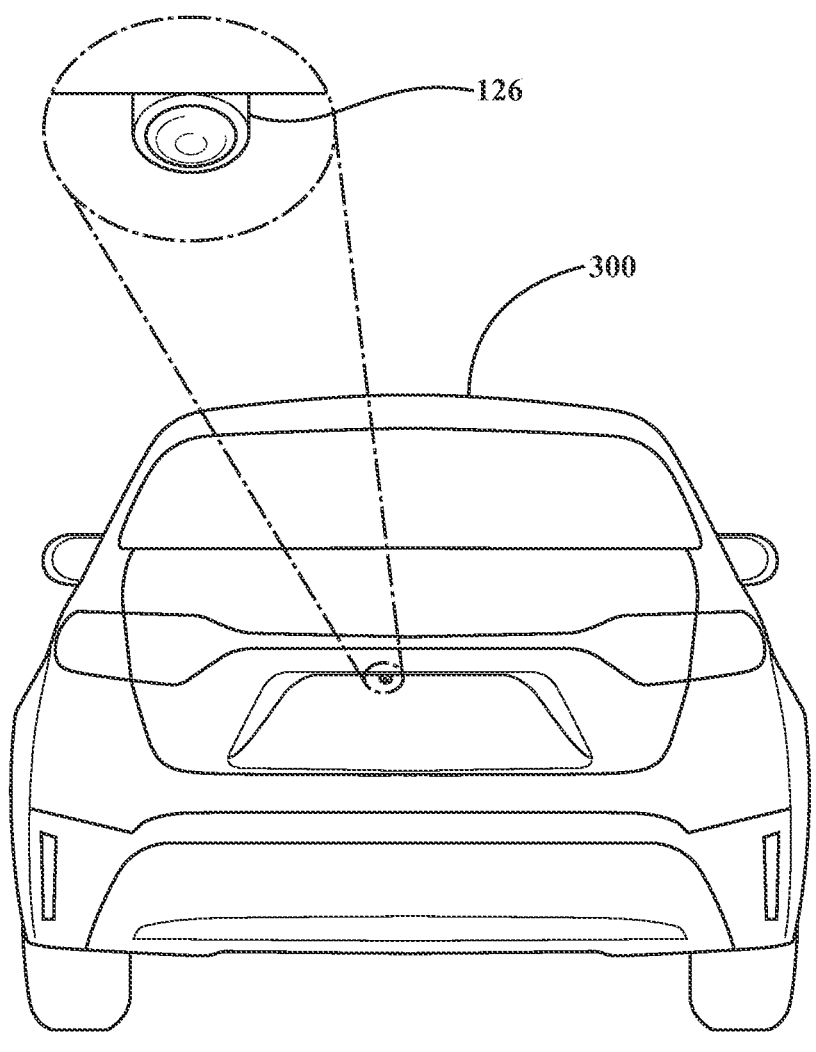
FIG. 3A illustrates one embodiment of a camera that is retrofitted to a vehicle and used to provide vision assistance.
Figure 3B:
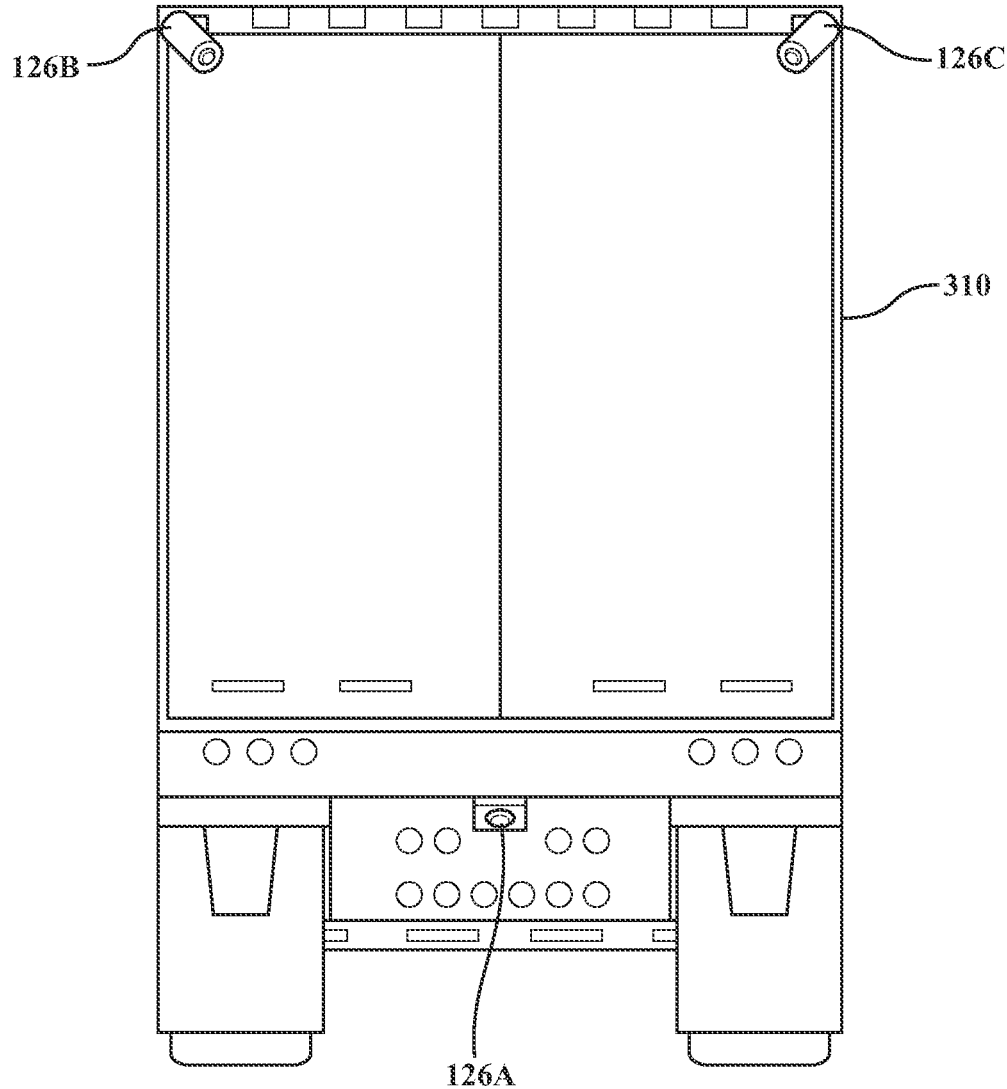
FIG. 3B illustrates one embodiment of a system of cameras that are retrofitted to a vehicle and used to provide vision assistance.

Referring now to FIGS. 3A and 3B, examples of vehicles retrofitted with monocular camera(s) 126 are shown. FIG. 3A shows a first example of a vehicle 300 with a singular camera 126 retrofitted to a rear area of the vehicle 300. As shown, the vehicle 300 is a passenger vehicle, such as a sedan, and the camera 126 is installed on a trunk door of the vehicle 300 in an area in which typical backup cameras are installed to passenger vehicles. Though not shown, the vehicle 300 can also include additional cameras 126 installed to other locations on the vehicle 300, for example, on a front bumper, on side view mirrors, etc.

FIG. 3B shows a second example of a vehicle 310 with multiple retrofitted cameras 126 retrofitted. As shown, the vehicle 310 is a semi-truck, however, the vehicle 310 can be another type of vehicle that may be susceptible to lower visibility than passenger vehicles. As shown, the vehicle 310 includes a first camera 126A installed to a lower rear area of the vehicle 310, a second camera 126B installed to a left upper corner of the vehicle 310, and a third camera 126C installed to a right upper corner of the vehicle 310. It should be understood, though, that the cameras 126A, 126B, and 126C can be installed to other areas of the vehicle 310 that may benefit from camera-based vision, for example, areas of the vehicle 310 that typically cause blind spots. Moreover, the vehicle 310 can have another number of cameras 126, for example, one camera 126, two cameras 126, four cameras 126, five cameras 126, six cameras 126, etc. In instances in which a vehicle 100 is equipped with multiple cameras 126, the cameras 126 may have overlapping FOVs.

Referring back to the monocular image, the monocular image itself includes visual data of the FOV that is encoded according to a video/image standard (e.g., codec) associated with the camera 126. In general, the characteristics of the camera 126 and a video/image standard define a format of the monocular image. Thus, while the particular characteristics can vary according to different implementations, in general, the image has a defined resolution (i.e., height and width in pixels) and format. Thus, for example, the monocular image is generally an RGB visible light image. Whichever format that the depth system 170 implements, the images 250 include monocular images in that there is no explicit additional modality indicating depth nor an explicit corresponding image from another camera from which the depth can be derived (i.e., no stereo camera pair). In contrast to a stereo image that may integrate left and right images from separate cameras mounted to generate an overlapping FOV to provide an additional depth channel, the monocular image does not include explicit depth information, such as disparity maps derived from comparing the stereo images pixel-by-pixel. Instead, the monocular image implicitly provides depth information in the relationships of perspective and size of elements depicted therein from which the depth model derives the depth maps.

Moreover, the monocular video may include observations of many different scenes. That is, as the camera 126 or another original source camera of the video progresses through an environment, perspectives of objects and features in the environment change, and the depicted objects/features themselves also change, thereby depicting separate scenes (i.e., particular combinations of objects/features). Thus, the depth system 170 may extract particular training sets (e.g., pairs of source and target images) of monocular images from the monocular video for training. In particular, the depth system 170 generates a set of images from the video so that the sets of images are of the same scene and are related through the depiction of the same scene. As should be appreciated, the video includes a series of monocular images that are taken in succession according to a configuration of the camera 126. Thus, the camera 126 may generate the images 250 (also referred to herein as frames) of the video at regular intervals, such as every 0.033 s. That is, a shutter of the camera operates at a particular rate (i.e., frames-per-second (fps)), which may be, for example, 24 fps, 30 fps, 60 fps, etc.

For purposes of the present discussion, the fps is presumed to be 30 fps. However, it should be appreciated that the fps may vary according to a particular configuration. Moreover, the depth system 170 need not generate the images for training from successive ones (i.e., adjacent) of the frames from the video, but instead can generally include separate images of the same scene that are not successive as training images. Thus, in one approach, the depth system 170 selects every other image depending on the fps. In a further approach, the depth system selects every fifth image as a training pair. The greater the timing difference in the video between the images, the more pronounced a difference in the position of the camera 126; however, this may also result in fewer shared features/objects between the images. As such, the pairs of training images are of a same scene and are generally constrained, in one or more embodiments, to be within a defined number of frames (e.g., 5 or fewer) to ensure correspondence of an observed scene between the monocular training images. In any case, the pairs of training images generally have the attributes of being monocular images from a monocular video that are separated by some interval of time (e.g., 0.06 s) such that a perspective of the camera 126 changes between the pair of training images as a result of the motion of the camera 126 through the environment while generating the video.

Moreover, while the images 250 are described as training images (i.e., for purposes of adapting the depth model to improve accuracy/understanding), the depth system 170 similarly processes images of the same/similar character after training and during inference to generate the noted outputs (i.e., the depth maps). Thus, during inference and while in use as implemented, the images 250 are instead derived from a monocular camera and may not be associated via a video. Additionally, while the depth model generates a single depth map per image, the pose model accepts inputs of multiple images (e.g., two or more) to produce outputs (i.e., a transformation between image views).

With further reference to FIG. 2, the depth system 170 further includes the models 260, which include the depth model that produces the depth maps, and, in at least one approach, a semantic model. The semantic model and the depth model are, in one embodiment, machine learning algorithms. However, the particular form of the models 260 may be generally distinct. That is, for example, the depth model is a machine learning algorithm that accepts an electronic input in the form of a single monocular image and produces a depth map as a result of processing the monocular image. The exact form of the depth model may vary according to the implementation but is generally a convolutional encoder-decoder type of neural network.

Figure 4:
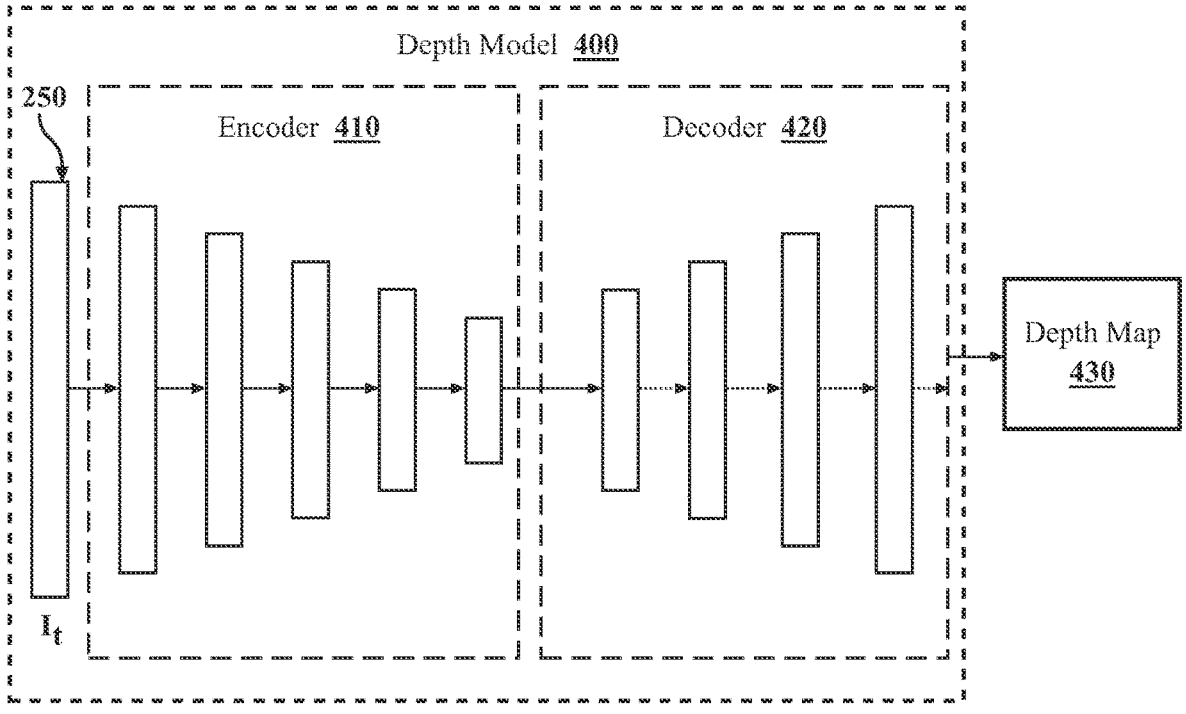
FIG. 4 illustrates one embodiment of a depth model that infers depth from a monocular image.

As an additional explanation of one embodiment of the depth model, consider FIG. 4. FIG. 4 illustrates a detailed view of a depth model 400. In one embodiment, the depth model 400 has an encoder/decoder architecture. The encoder/decoder architecture generally includes a set of neural network layers, including convolutional components embodied as an encoder 410 (e.g., 2D and/or 3D convolutional layers forming an encoder) that flow into deconvolutional components embodied as a decoder 420 (e.g., 2D and/or 3D deconvolutional layers forming a decoder). In one approach, the encoder 410 accepts one of the images 250 at a time as an electronic input and processes the image to extract features therefrom. The features are, in general, aspects of the image that are indicative of spatial information that the image intrinsically encodes. As such, encoding layers that form the encoder function to, for example, fold (i.e., adapt dimensions of the feature map to retain the features) encoded features into separate channels, iteratively reducing spatial dimensions of the image while packing additional channels with information about embedded states of the features. Thus, the addition of the extra channels avoids the lossy nature of the encoding process and facilitates the preservation of more information (e.g., feature details) about the original monocular image.

Accordingly, in one embodiment, the encoder 410 is comprised of multiple encoding layers formed from a combination of two-dimensional (2D) convolutional layers, packing blocks, and residual blocks. Moreover, the separate encoding layers generate outputs in the form of encoded feature maps (also referred to as tensors), which the encoding layers provide to subsequent layers in the depth model 400. As such, the encoder 410 includes a variety of separate layers that operate on the monocular image, and subsequently on derived/intermediate feature maps that convert the visual information of the monocular image into embedded state information in the form of encoded features of different channels.

In one embodiment, the decoder 420 unfolds (i.e., adapts dimensions of the tensor to extract the features) the previously encoded spatial information in order to derive the depth map 430 for a given image 250 according to learned correlations associated with the encoded features. That is, the decoding layers generally function to up-sample, through sub-pixel convolutions and/or other mechanisms, the previously encoded features into the depth map 430, which may be provided at different resolutions. In one embodiment, the decoding layers comprise unpacking blocks, two-dimensional convolutional layers, and inverse depth layers that function as output layers for different scales of the feature map. The depth map 430 is, in one embodiment, a data structure corresponding to the input image that indicates distances/depths to objects/features represented therein. Additionally, in one embodiment, the depth map 430 is a tensor with separate data values indicating depths for corresponding locations in the image on a per-pixel basis.

Moreover, the depth model 400 can further include skip connections for providing residual information between the encoder 410 and the decoder 420 to facilitate memory of higher-level features between the separate components. While a particular encoder/decoder architecture is discussed, as previously noted, the depth model 400, in various approaches, may take different forms and generally functions to process the monocular images and provide depth maps that are per-pixel estimates about distances of objects/features depicted in the images.

Moreover, while the semantic model is not explicitly illustrated, it should be noted that the semantic model may be comprised of a similar encoder/decoder architecture that separately processes the images 250 to provide semantic mapping of the images. Accordingly, the semantic model may be a convolutional neural network (CNN). In one arrangement, the semantic model and the depth model 400 may share the encoder 410 while having distinct decoder heads for the separate tasks. Additionally, the semantic model also uses images for training, but the images may be combined with semantic labels as a source of supervision to facilitate the training. In this way, the semantic model is able to learn an ontology for objects and portions of objects depicted in the images. The particular degree of identification (i.e., object, object component, etc.) may be further supplemented by, in one or more arrangements, one or more intermediate models that further segment and identify components of the overall object. In any case, the semantic model processes the images to output a semantic mapping that details classifications for objects and portions of objects depicted in the image. It should be noted that the semantic model may be substituted with another machine-learning model that performs object detection/recognition using other algorithms, for example, clustering, single shot detection, or another object detection algorithm.

As an additional note, while the models 260 are discussed as discrete units separate from the depth estimation module 220, the models 260 are, in one or more arrangements, generally integrated, at least in part, with the depth estimation module 220. That is, the depth estimation module 220 functions to execute various processes of the models 260 and use various data structures of the models 260 in support of such execution. Accordingly, in one embodiment, the depth estimation module 220 includes instructions that function to control the processor 110 to generate the outputs using the models 260.

Figure 5:
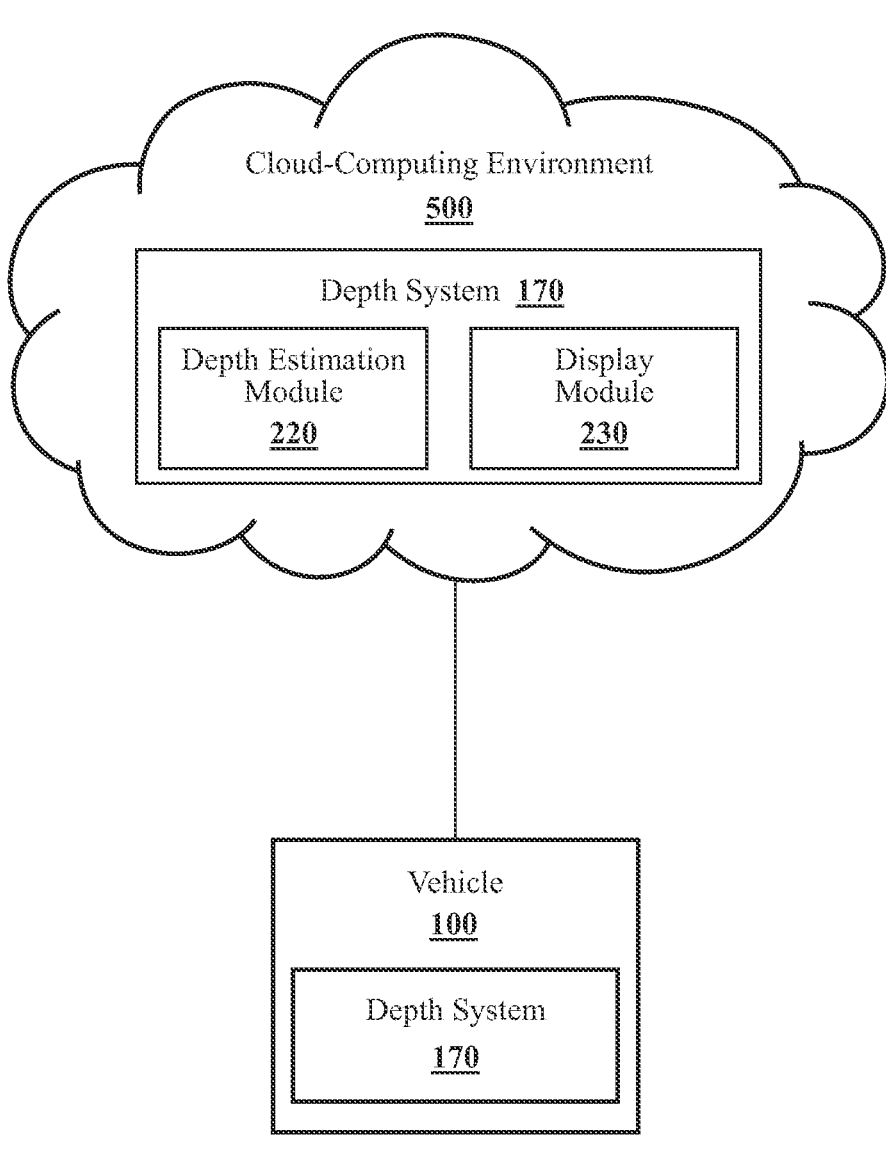
FIG. 5 illustrates one embodiment of the depth system of FIG. 2 in a cloud-computing environment.

Referring now to FIG. 5, in one embodiment, the depth system 170 as illustrated in FIG. 2 is generally an abstracted form of the depth system 170 as may be implemented between the vehicle 100 and a cloud-computing environment. FIG. 5 illustrates one example of a cloud-computing environment 500 that may be implemented along with the depth system 170. As illustrated in FIG. 5, the depth system 170 is embodied at least in part within the cloud-computing environment 500. In one approach, the image processing methods described herein, for example, machine learning methods and model improvement, may be implemented in the cloud-computing environment 500. In another example, the depth system 170 may operate to acquire images from the camera(s) 126 which are then transmitted to the cloud-computing environment 500 for processing by the modules 220, 230. The cloud-computing environment may then provide results of the processing (e.g., annotated images) back to the vehicle 100 for display. In one or more other embodiments, the depth system 170 may operate to acquire images from the camera(s) 126 which are then processed on-board the vehicle 100 by the processors 110. More specifically, in these one or more embodiments, depth estimation is accomplished on-board the vehicle 100 by the processors 110.

Figure 6:
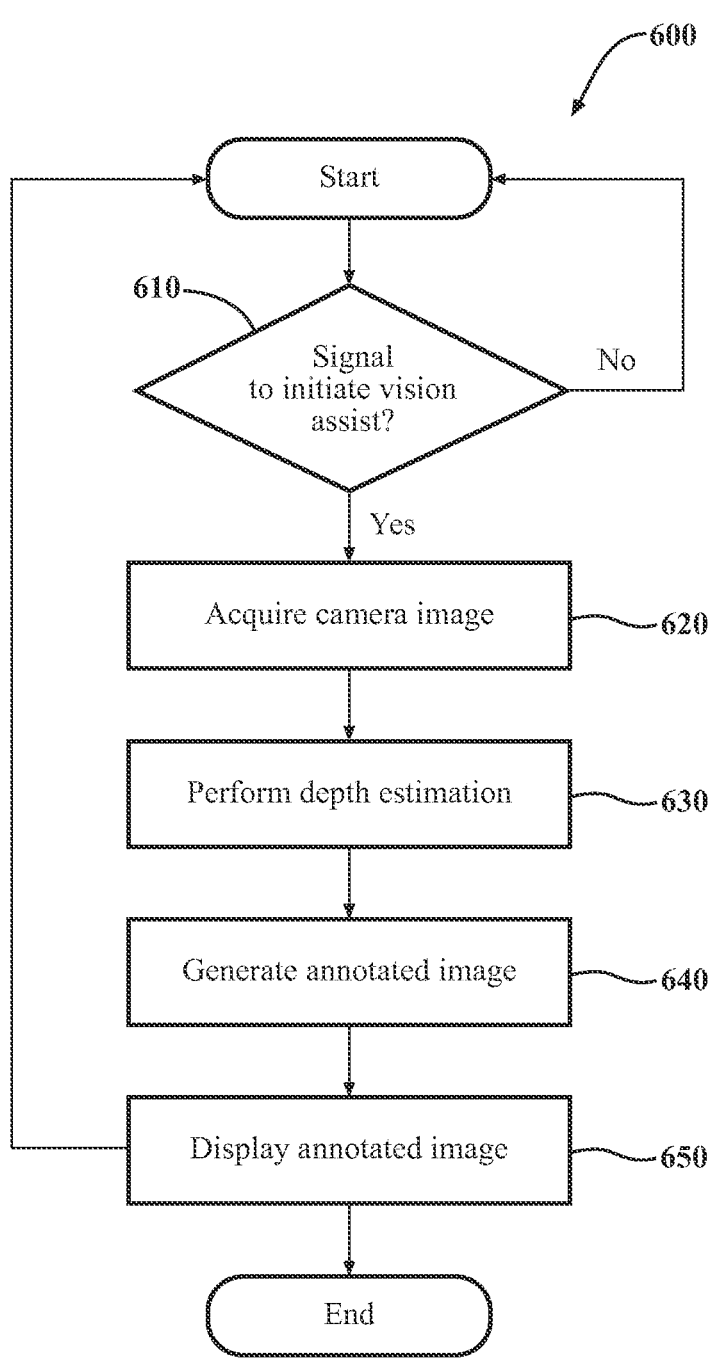
FIG. 6 illustrates one embodiment of a method of providing vision assistance in a vehicle based on monocular depth estimation.

Additional aspects of the depth system 170 will be discussed in relation to FIG. 6. FIG. 6 illustrates a flowchart of a method 600 that is associated with operating the depth system 170. Method 600 will be discussed from the perspective of the depth system 170 of FIGS. 1 and 2. While the method 600 is discussed in combination with the depth system 170, it should be appreciated that the method 600 is not limited to being implemented within the depth system 170 but is instead one example of a system that may implement the method 600.

At 610, the depth estimation module 220 receives a signal to initiate vision assist. In one approach, the depth estimation module 220 receives the signal from a gearshift of the vehicle 100 when the gearshift is moved to the "reverse" position. In this instance, vision assist is initiated automatically when a driver of the vehicle 100 reverses the vehicle 100 to aid the driver in perceiving and understanding the surrounding environment to the rear of the vehicle 100. In another approach, the depth estimation module 220 receives the signal from a user interface of the vehicle 100. In this instance, vision assist is initiated by the driver when the driver wants to gain a better understanding of the surrounding environment of the vehicle 100, for example, during parking, when driving through tight spaces (e.g., a garage), etc. The user interface can be one or more of display systems described in further detail below in connection with FIG. 8 or another type of user interface, such as a button on an instrument panel of the vehicle, a personal electronic device such as a smartphone, etc.

At 620, the depth estimation module 220 controls the sensor system 120 to acquire the images 250. In one embodiment, the depth estimation module 220 controls the camera(s) 126 of the vehicle 100 to observe the surrounding environment and acquire images 250 of the surrounding environment. Moreover, in further embodiments, the depth estimation module 220 controls the camera(s) 126 to acquire the images 250 at successive iterations or time steps. Thus, the depth system 170, in one embodiment, iteratively executes the functions discussed at block 620 to acquire the images 250 and provide information therefrom. Additionally, while the depth estimation module 220 is discussed as controlling the various cameras 126 to provide the images 250, in one or more embodiments, the depth estimation module 220 can employ other techniques to acquire the images 250 that are either active or passive.

In one approach, the depth estimation module 220 actively acquires the images 250 from the camera(s) 126. That is, in one example, while the vehicle 100 is operating in an environment, the depth estimation module 220 captures the images 250, which the depth system 170 then processes according to the method 600. The images 250 are generally described as being "original images" herein, which is in reference to an unaltered form of the image 250. The images 250 depict objects in an environment in which the camera(s) 126 have a particular FOV.

At 630, the depth estimation module 220 performs monocular depth estimation on one or more of the acquired images 250. In other words, at 630, the depth estimation module 220 generates a depth map for the image(s) 250. In one approach, the depth estimation module 220 applies the depth model to the image to derive the depth map. The depth map provides a pixel-wise estimation of three-dimensional data associated with the original image 250, such as depth values, within a scene depicted by the image 250. This includes distances from the camera 126 to various features depicted in the image 250, such as vehicles, buildings, road surfaces, trees, people, and so on. In general, the depth map provides depth information at a granularity of the pixel. Accordingly, the depth map includes corresponding depth values (i.e., distances from a common point of the camera 126) for separate pixels in the image 250. As such, the level of detail in the depth map relates to the resolution of the original image 250.

In some instances, in addition to performing depth estimation at 630, the depth estimation module 220 also perceives and identifies objects in the FOV of the camera 126 using the semantic model (or another object recognition model). In such instances, the depth estimation module 220 can actively perform object recognition and/or classification to identify various types of objects. In some cases, the depth estimation module 220 uses the identification of objects as well as the distances of those objects as determined by the depth model 400 in order to issue warnings or provide other information regarding the objects to the user. Active identification of objects in the FOV of the camera 126 will be described in further detail below. That is, the depth estimation module 220 actively identifies particular objects and according to associated distances from the depth map and identified physical dimensions of the object and specifically highlights the object.

Figure 7A:
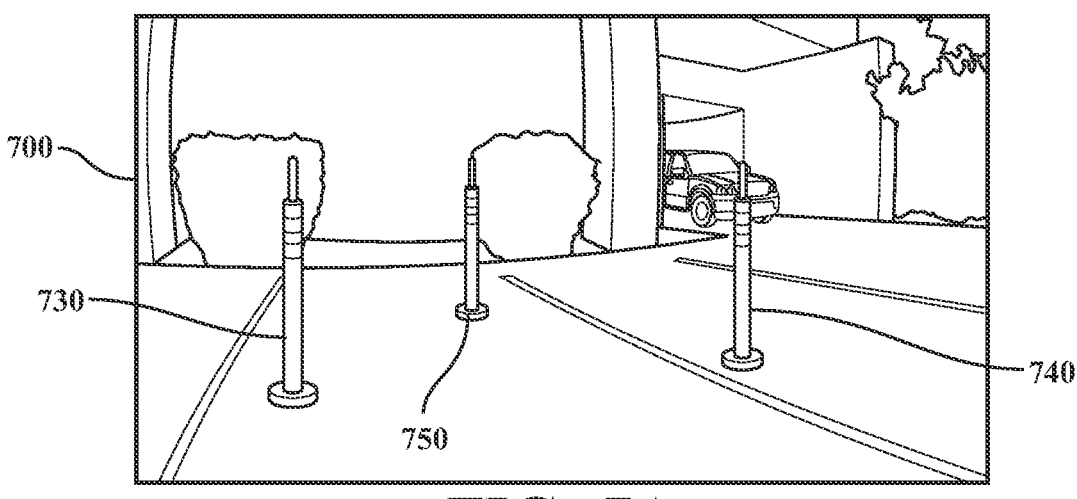
FIG. 7A illustrates one embodiment of a monocular camera image.
Figure 7B:
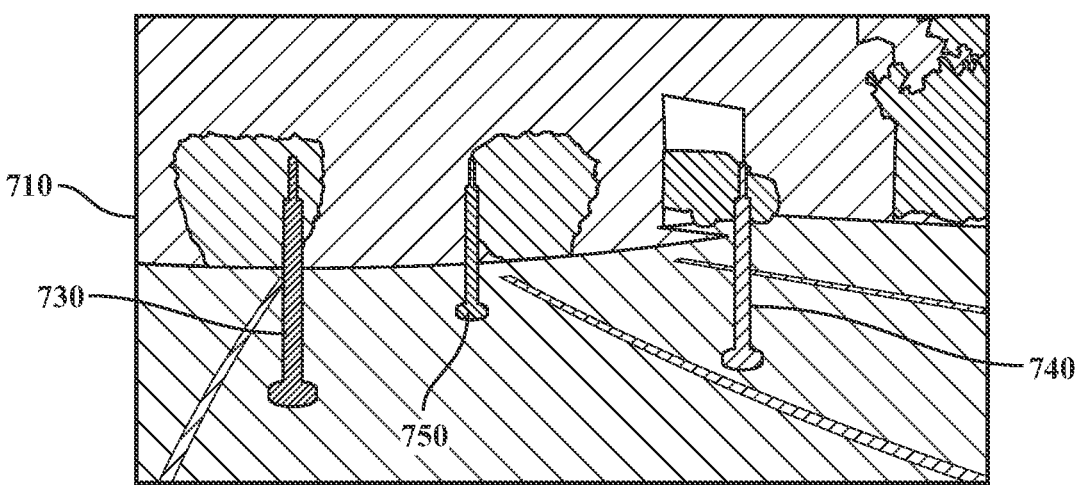
FIG. 7B illustrates one embodiment of a depth map that is generated based on a monocular camera image.

Referring now to FIGS. 7A and 7B, examples of a camera image 700 and corresponding depth map 710 are shown. As shown, the camera image 700 is acquired from a monocular camera 126 installed to the rear of a vehicle. The camera image 700 includes a view to the rear of the vehicle and shows a building, parking spaces, and traffic cones 730, 740, 750. It should be understood that the camera image 700 is just one example of a camera image that the depth estimation module 220 can acquire at 620. Turning now to FIG. 7B, the depth map 710 is a depth map generated based on the camera image 700. In the depth map 710, features such as the building and the traffic cones 730, 740, 750 are shown according to their depths to the camera 126 that obtained the camera image 700. As described in further detail below, the depth estimation module 220 can identify objects in the camera image 700. For example, the depth estimation module 220 can use the semantic model to identify the traffic cones in the camera image 700.

Figure 7C:
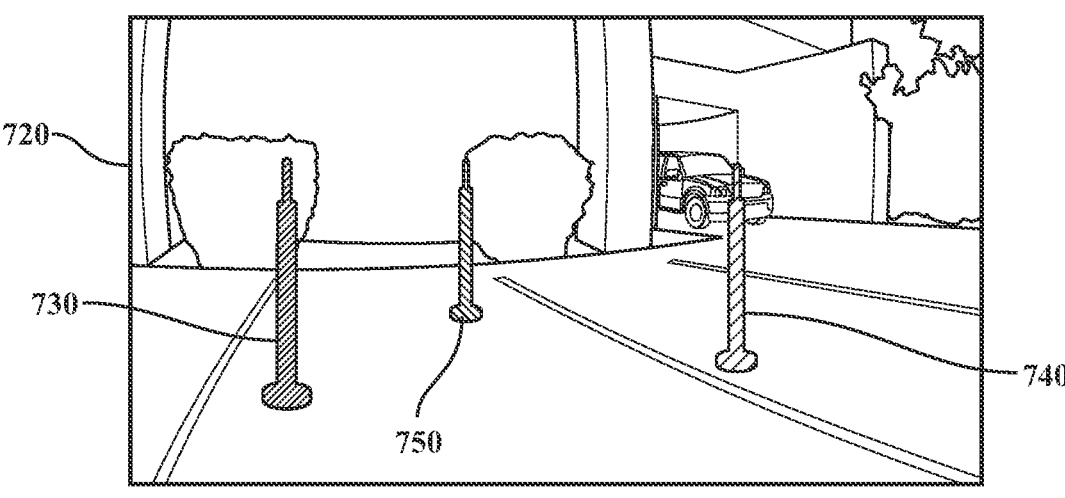
FIG. 7C illustrates one embodiment of an annotated image that is generated based on a monocular camera image and a depth map.

Continuing with FIG. 6, at 640, in one approach, the depth estimation module 220 generates an annotated image, which is, in one embodiment, a camera image that shows three-dimensional data related to the depth map. The annotated image, when viewed by an operator of the vehicle, enables the operator to readily perceive objects in the FOV of the camera 126 and understand their distances to the vehicle 100. Accordingly, the annotated image aids the operator in understanding an external environment of the vehicle. The annotated image, in one approach, is generated based on the camera image and the depth map. An example annotated image 720 is shown in FIG. 7C. The annotated image 720, as shown, is generated based on the camera image 700 of FIG. 7A and the depth map 710 of FIG. 7B and will be described in further detail below.

As mentioned above, in one example, the depth estimation module 220 generates the annotated image based on the three-dimensional data. For example, in one approach, the depth estimation module 220 generates the annotated image by colorizing objects in the image according to their distances to the camera 126. In one approach, the depth estimation module 220 colorizes objects in the image by colorizing the image according to the values of the depth map. In this approach, referring to FIG. 7C for example, the camera image 700 would be colorized according to the depth map 710. In this way, the traffic cones 730, 740, 750 may be colorized differently as a result of their different depths from the camera 126. In this approach, the depth estimation module 220 colorizes objects on a pixel-wise basis based solely on the depth information.

In another approach, the depth estimation module 220 leverages both the depth model and the semantic model to colorize objects. In this approach, referring again to FIG. 7C for example, the depth estimation module 220 utilizes the semantic model to identify the three traffic cones 730, 740, 750 as separate discrete objects and utilizes the depth model to identify the distance of each traffic cone to the camera 126. The depth estimation module 220 can then colorize the traffic cones 730, 740, 750 in different colors based on their distances to the camera 126.

In either of the above described approaches, the depth estimation module 220 can take various approaches to the specific method of colorizing objects. In one example, the depth estimation module 220 colorizes objects that are within a distance threshold to the camera 126. For example, the depth estimation module 220 highlights objects that are within 1 meter (m) from the camera 126. The depth estimation module 220 may consider other distance thresholds as well, for example, 10 centimeters (cm), 50 cm, 2 m, 3 m, etc. The depth estimation module 220 can highlight objects within the distance threshold by shading and/or outlining the objects with a bright color, such as yellow, or with a color that is not prominent in the original image.

In another approach, the depth estimation module 220 generates the annotated image by colorizing objects in the image according to a risk of impact between the vehicle 100 and the objects. The risk of impact, in one example, is calculated based on various information including the dimensions of the vehicle 100 (described in further detail below), the three-dimensional location of objects near the vehicle 100, and travel information of the vehicle 100, which may include a location, a speed, an acceleration, and/or a heading of the vehicle 100. In one approach, the depth estimation module 220 calculates the risk of impact. In doing so, the depth estimation module 220 can colorize objects in the image and otherwise provide information to the user regarding the ability of the vehicle 100 to navigate the surrounding environment. For example, the depth estimation module 220 can calculate risk to determine whether the vehicle 100 can fit between two other vehicles in a parking lot, whether the vehicle 100 can drive over a certain object such as a branch on the road, whether the vehicle 100 can drive under an overpass, whether the vehicle 100 can drive over a deep pot hole, etc.

An example of object colorization according to risk of impact is shown in FIG. 7C. In the annotated image 720, three traffic cones 730, 740, and 750 are shown, each traffic cone being located a different distance from the camera 126. As shown in the annotated image 720, each traffic cone can be colorized according to the distance from each traffic cone to the camera 126. For example, the first traffic cone 730 can be colored red to indicate a high risk of impact between the vehicle 100 and the first traffic cone 730. The second traffic cone 740 can be colored yellow to indicate a medium risk of impact between the vehicle 100 and the second traffic cone 740. The third traffic cone 750 can be colored green to indicate a low risk of impact between the vehicle 100 and the third traffic cone 750.

In yet another approach, objects themselves can be colorized according to their varying depths. For example, a vehicle in the original image having a hood and windshield of different depths from the camera 126 can be colorized to reflect the three-dimensional shape of the vehicle. In one approach, this involves shading the object, for example, with a gradient, to show the three-dimensional shape of the object. It should be noted that in generating the annotated image, the above-described approaches to colorizing objects can be used separately or in various combinations.

Referring back to FIG. 6, at 650, in one approach, the display module 230 displays the annotated image. Displaying the annotated image may aid the driver in understanding the surrounding environment of the vehicle 100. The display module 230, in one approach, displays the annotated image on a display system of the vehicle 100. Example display systems are shown in FIG. 8.

Figure 8:
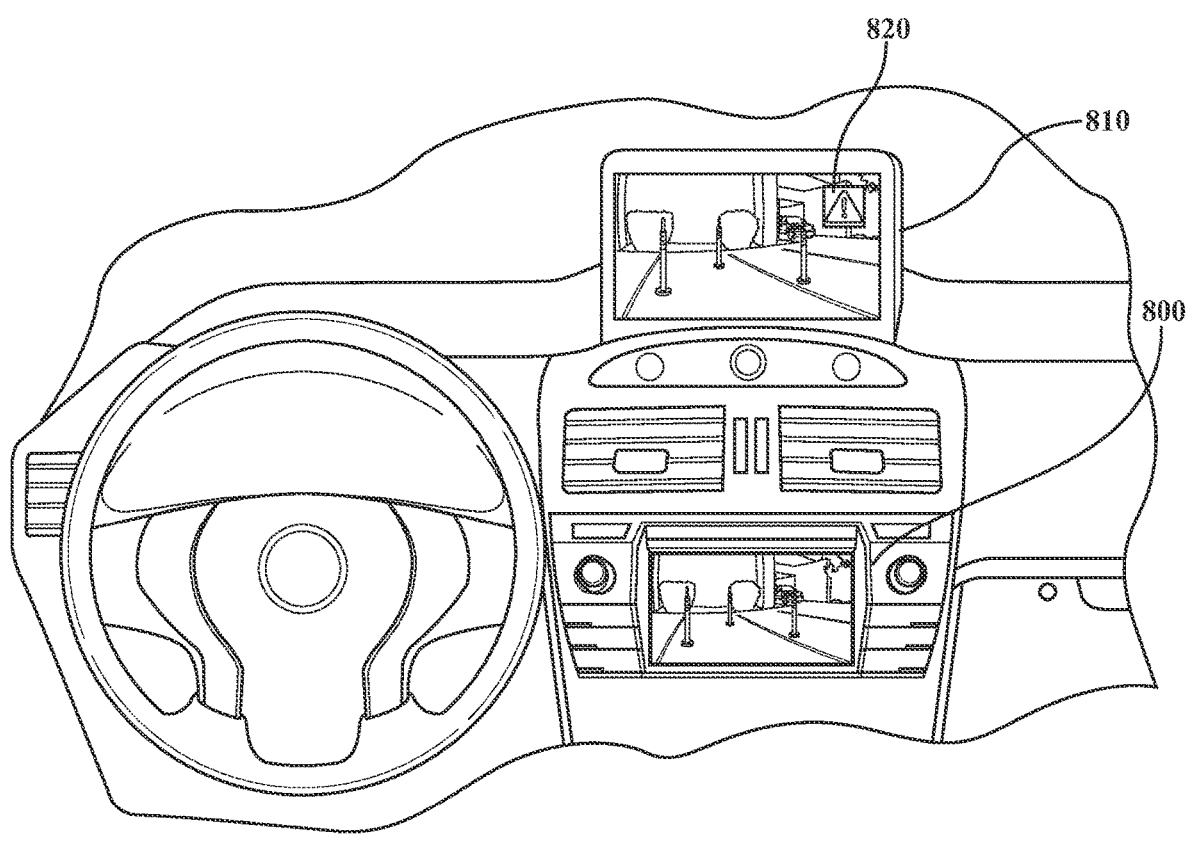
FIG. 8 illustrates first and second embodiments of a display system that is used to display an annotated image.

FIG. 8 shows a first display system 800 and a second display system 810. The first display system 800, in one approach, is a preexisting user interface of the vehicle 100. The second display system 810, in one approach, is a separate head-unit that is mounted to a surface of the vehicle 100 within a passenger compartment of the vehicle 100. For example, the head-unit can be mounted to a dashboard of the vehicle 100. In embodiments in which the camera(s) 126 are retrofitted to the vehicle 100, the camera(s) 126 can be connected to the vehicle 100 and also to the display system 800, 810. In either above-described example and in other examples, the camera(s) 126 are connected to the vehicle 100 and the display system 800, 810 through hard-wiring, Bluetooth, Wi-Fi, etc.

In some instances, in addition to displaying the annotated image at 650, the display module 230 also issues one or more alerts to the user. The display module 230 can issue alerts based on the depth of identified obstacles to the vehicle 100. For example, the display module 230 can issue an alert to the user when the depth of an identified obstacle to the vehicle 100 is less than a predetermined threshold. The alerts can include audible warnings, haptic warnings, and/or visual warnings. For example, the alert can include a sound, a flashing light, an icon on a display system (such as the warning sign 820 of FIG. 8), or a vibration of a steering wheel of the vehicle 100 that indicates to the user that the vehicle 100 is at risk of collision with an identified obstacle.

In addition to or alternatively to colorizing an annotated image and/or providing alerts to a user, the depth estimation module can also generate an annotated image by generating a three-dimensional representation of a scene surrounding the vehicle according to multiple depth maps. The three-dimensional representation can be generated by stacking the point clouds of multiple images from one camera 126 or multiple images from multiple cameras 126 (and/or stitching together multiple annotated images from one or more cameras 126) to generate a depiction of the environment that is richer than may otherwise be obtained with conventional cameras and/or ultrasonic sensors.

The depth estimation module 220, in one approach, colorizes the three-dimensional representation, according to the depth information. In such instances, at 630, the depth estimation module 220 estimates depth information of features in additional images (from the same cameras 126 or from additional cameras 126) to output multiple depth maps including three-dimensional data of the additional images, for example, a point cloud for each camera image.

As described above, one or more monocular cameras 126 can be retrofitted to the vehicle 100. Accordingly, in some instances, a user of the vehicle or another person retrofitting the camera(s) 126 to the vehicle 100 may choose a location on the vehicle 100 in which to install the camera(s) 126. In such instances, it may be advantageous to calibrate the camera(s) 126 with respect to the vehicle 100 so that the depth estimation module 220 can make more accurate determinations about which obstacles in the surrounding environment of the vehicle 100 may pose a risk of impact.

Figure 9:
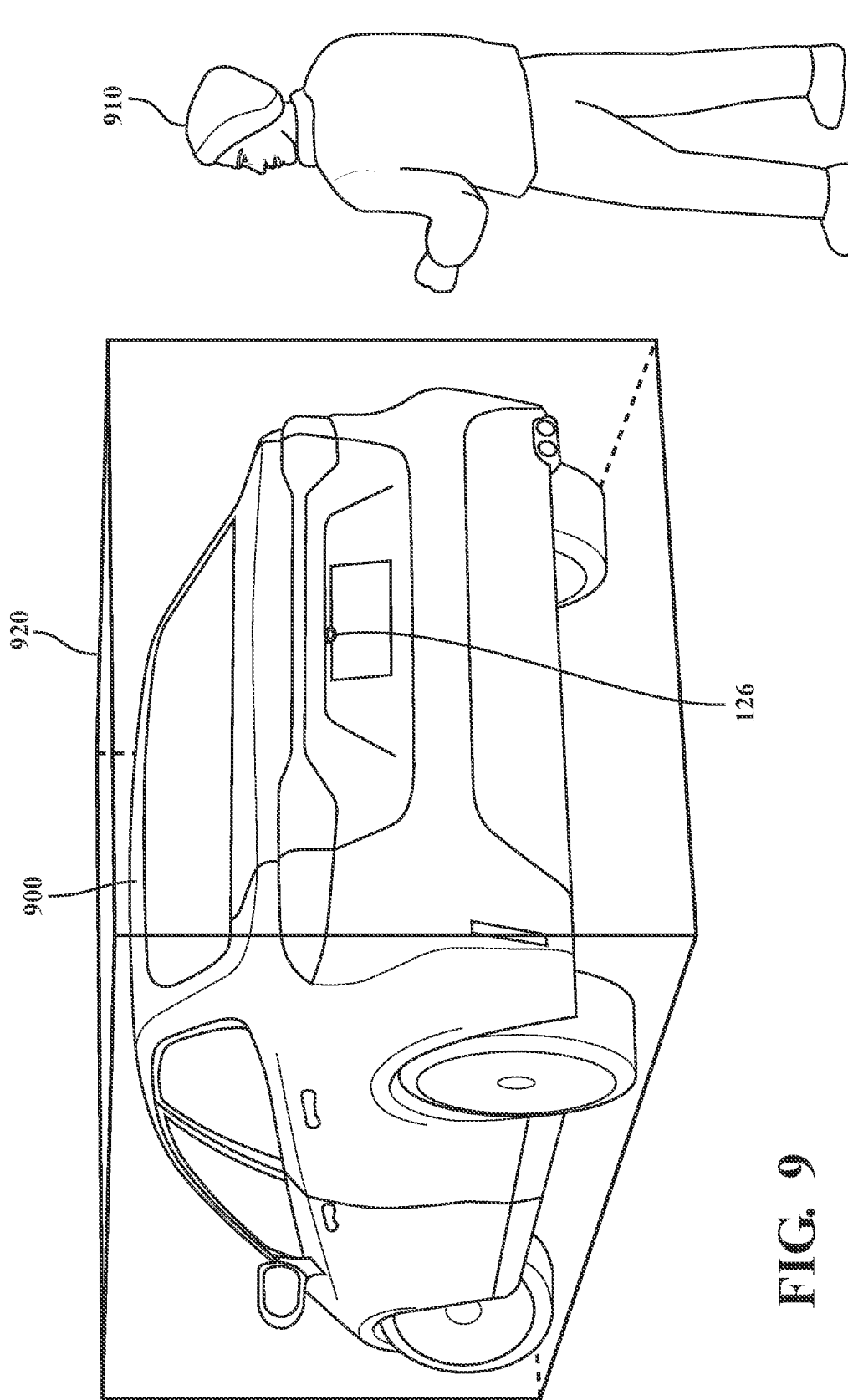
FIG. 9 illustrates one embodiment of a bounding box for the vehicle of FIG. 3A that is used to calibrate a camera retrofitted to the vehicle.

As shown in FIG. 9 and as mentioned above, a vehicle 900 may be retrofitted with a monocular camera 126. The monocular camera 126 may see an object or a person 910 (or at least a portion of the person 910) standing near the vehicle 900 in the FOV of the camera 126. As mentioned above, the camera 126 may be calibrated for depth estimation relative to the vehicle 900. Calibration may be accomplished in various manners.

In one example, the cameras 126 can be calibrated using the person 910 in the FOV (or another object in the FOV) of the camera. Through detection of the person 910, the camera 126 can determine its position relative to the vehicle 900. In another example, the data store 240 may include a digitized model of the vehicle 900, and a user can select an area on the digitized model to which the camera 126 is retrofitted. Using the location of the camera 126 on the digitized model, the depth estimation module 220 can identify a location of the camera 126 relative to the dimensions of the vehicle 900, which may be provided by the digitized model.

In yet another example, as illustrated in FIG. 9, the depth estimation module 220 calibrates the camera 126 for depth estimation relative to the vehicle 900 by receiving information regarding one or more dimensions of the vehicle 900, constructing a bounding box 920 to relate the dimensions of the vehicle 900 with the camera 126, and defining a location in which the camera is retrofitted to the vehicle 900 using the bounding box 920. In this approach, the depth estimation module 220 estimates depth information of features in one or more images 250 acquired by the camera 126 by performing depth estimation using the bounding box 920 to identify locations of objects in the image(s) 250 relative to dimensions of the vehicle 900. The depth estimation module 220 may receive the dimensions of the vehicle 900 from the data store 240, from a manual user input, or from another source. The dimensions can include the length, width, height, ground clearance, wheel base, and/or other dimensions of the vehicle 900.

When the location of the camera 126 is identified with respect to the vehicle 900, the depth estimation module 220 can use this information to combine images (e.g., stack point clouds) from the camera 126 to re-create a digital, three-dimensional representation of the surrounding environment of the vehicle 100. Moreover, the depth estimation module 220 can leverage the dimensions of the vehicle 100 in combination with the three-dimensional representation of the surrounding environment to determine obstacles around which the vehicle can or cannot navigate, as described above.

It should be noted that in instances in which the vehicle 100 is equipped with a single monocular camera 126, as well as instances in which the vehicle 100 is equipped with multiple monocular cameras 126, the depth estimation module 220 can calibrate the camera(s) 126 for depth estimation relative to the vehicle 100. Moreover, in instances in which the vehicle 100 includes multiple monocular cameras 126, the monocular cameras 126 may be retrofitted to different areas of the vehicle 100, for example, as shown in FIG. 3B. In such instances, the depth estimation module 220, in one approach, estimates depth information of features in camera images acquired by the cameras 126 to output depth maps by identifying relative locations of the cameras 126 with respect to the vehicle 100. The depth estimation module 220, in one approach, identifies relative locations of the cameras 126 with respect to the vehicle 100 by comparing camera images acquired by the cameras 126.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known, or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110 and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110 and/or the automated driving module(s) 160 may control some or all of these vehicle systems 140 and, thus, may be partially or fully autonomous.

The processor(s) 110 and/or the automated driving module(s) 160 can be operatively connected to communicate with the various vehicle systems 140 and/or individual components thereof. For example, returning to FIG. 1, the processor(s) 110, the depth system 170, and/or the automated driving module(s) 160 can be in communication to send and/or receive information from the various vehicle systems 140 to control the movement, speed, maneuvering, heading, direction, etc. of the vehicle 100. The processor(s) 110 and/or the automated driving module(s) 160 may control some or all of these vehicle systems 140.

The processor(s) 110 and/or the automated driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the automated driving module(s) 160 can control the direction and/or speed of the vehicle 100. The processor(s) 110 and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive and/or determine location information for obstacles within the external environment of the vehicle 100 for use by the processor(s) 110 and/or one or more of the modules described herein to estimate position and orientation of the vehicle 100, vehicle position in global coordinates based on signals from a plurality of satellites, or any other data and/or signals that could be used to determine the current state of the vehicle 100 or the position of the vehicle 100 with respect to its environment for use in either creating a map or determining the position of the vehicle 100 in respect to map data.

The automated driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the images 250. In general, the automated driving module(s) 160 may function to implement different levels of automation, including advanced driving assistance (ADAS) functions, semi-autonomous functions, and fully autonomous functions. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

The embodiments described herein provide the advantage of leveraging the lightweight nature of monocular depth estimation according to a single camera to estimate depth information of features in a surrounding environment of a vehicle. The approaches described herein thereby provide a less complex and cheaper vision assist system that provides an operator of a vehicle with information regarding the surrounding environment of the vehicle. In any case, the information acquired from monocular depth estimation is much richer than that provided by ultrasonic sensors, thereby providing an operator of a vehicle with much more detailed information about features in the surrounding environment of the vehicle.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8B, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and which, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
   a processor;
   a memory communicably coupled to the processor and storing:
   a depth estimation module including instructions that, when executed by the processor, cause the processor to:
      calibrate a monocular camera retrofitted to a vehicle by receiving information regarding one or more dimensions of the vehicle, constructing a bounding box to relate the one or more dimensions with the monocular camera, and defining a location of the monocular camera relative to the vehicle using the bounding box;
      acquire a camera image from the monocular camera and additional images from additional cameras on the vehicle;
      estimate depth information of features including objects in the camera image and the additional images to by performing depth estimation using the bounding box to identify locations of the objects relative to the vehicle and output depth maps including three-dimensional data associated with the camera image and the additional images;
      generate an annotated image including a three-dimensional representation of a scene surrounding the vehicle based on the three-dimensional data; and
      display the annotated image to aid a driver in understanding the scene by superimposing colors onto the objects according to the depth information.

2. The system of claim 1, wherein the instructions to estimate the depth information of the features include instructions to perceive objects in a field-of-view of the monocular camera and determine distances of the objects in the field-of-view from the monocular camera using a depth model that performs monocular depth estimation.

3. The system of claim 1, wherein the instructions to estimate the depth information of the features include instructions to perceive objects in a field-of-view of the monocular camera and determine distances of the objects in the field-of-view from the monocular camera, and wherein the instructions to generate the annotated image include instructions to colorize the objects in the field-of-view according to a risk of impact between the vehicle and the objects, wherein the risk of impact is calculated based on travel information of the vehicle, wherein the travel information includes at least one of a location, speed, acceleration, and heading of the vehicle.

4. The system of claim 1, wherein the instructions to estimate depth information of features include instructions to i) output a depth map including three-dimensional data associated with the scene depicted by the camera image, ii) perceive objects in a field-of-view of the monocular camera, and iii) determine distances of the objects in the field-of-view from the monocular camera according to the depth map, and wherein the instructions to generate the annotated image include instructions to highlight objects in the field-of-view that are within a distance threshold to the monocular camera.

5. The system of claim 1, wherein the additional cameras are retrofitted to different areas of the vehicle, and wherein the instructions to estimate depth information of features in the additional images to output depth maps include instructions to identify relative locations of the additional cameras with respect to the vehicle.

6. A non-transitory computer-readable medium including instructions that, when executed by a processor, cause the processor to:

calibrate a monocular camera retrofitted to a vehicle by receiving information regarding one or more dimensions of the vehicle, constructing a bounding box to relate the one or more dimensions with the monocular camera, and defining a location of the monocular camera relative to the vehicle using the bounding box;

acquire a camera image from the monocular camera and additional images from additional cameras on the vehicle;

estimate depth information of features including objects in the camera image and the additional images by performing depth estimation using the bounding box to identify locations of the objects relative to the vehicle and output depth maps including three-dimensional data associated with the camera image and the additional images;

generate an annotated image including a three-dimensional representation of a scene surrounding the vehicle based on the three-dimensional data; and display the annotated image to aid a driver in understanding the scene by superimposing colors onto the objects according to the depth information.

7. The non-transitory computer-readable medium of claim 6, wherein the instructions to estimate depth information of the features include instructions to perceive objects in a field-of-view of the monocular camera and determine distances of the objects in the field-of-view from the monocular camera using a depth model that performs monocular depth estimation.

8. The non-transitory computer-readable medium of claim 6, wherein the instructions to estimate depth information of features include instructions to perceive objects in a field-of-view of the monocular camera and determine distances of the objects in the field-of-view from the monocular camera, and wherein the instructions to generate the annotated image include instructions to colorize the objects in the field-of-view according to a risk of impact between the vehicle and the objects in the field-of-view, wherein the risk of impact is calculated based on travel information of the vehicle, wherein the travel information includes at least one of a location, speed, acceleration, and heading of the vehicle.

9. The non-transitory computer-readable medium of claim 6, wherein the instructions to estimate depth information of features include instructions to i) output a depth map including three-dimensional data associated with the scene depicted by the camera image, ii) perceive objects in a field-of-view of the monocular camera, and iii) determine distances of the objects in the field-of-view from the monocular camera according to the depth map, and wherein the instructions to generate the annotated image include instructions to highlight objects in the field-of-view that are within a distance threshold to the monocular camera.

10. A method comprising:

calibrating a monocular camera retrofitted to a vehicle by receiving information regarding one or more dimensions of the vehicle, constructing a bounding box to relate the one or more dimensions with the monocular camera, and defining a location of the monocular camera relative to the vehicle using the bounding box;

acquiring a camera image from the monocular camera and additional images from additional cameras on the vehicle;

estimating depth information of features including objects in the camera image and the additional images by performing depth estimation using the bounding box to identify locations of the objects relative to the vehicle and output depth maps including three-dimensional data associated with the camera image and the additional images;

generating an annotated image including a three-dimensional representation of a scene surrounding the vehicle based on the three-dimensional data; and displaying the annotated image to aid a driver in understanding the scene by superimposing colors onto the objects according to the depth information.

11. The method of claim 10, wherein estimating the depth information of the features in the camera image includes perceiving objects in a field-of-view of the monocular camera and determining distances of the objects in the field-of-view from the monocular camera using a depth model that performs monocular depth estimation.

12. The method of claim 10, wherein estimating depth information of features in the camera image includes perceiving objects in a field-of-view of the monocular camera and determining distances of the objects in the field-of-view from the monocular camera, and wherein generating the annotated image includes colorizing the objects in the field-of-view according to a risk of impact between the vehicle and the objects in the field-of-view, wherein the risk of impact is calculated based on travel information of the vehicle, wherein the travel information includes at least one of a location, speed, acceleration, and heading of the vehicle.

13. The method of claim 10, wherein estimating depth information of features in the camera image includes i) outputting a depth map including three-dimensional data associated with the scene depicted by the camera image, ii) perceiving objects in a field-of-view of the monocular camera, and iii) determining distances of the objects in the field-of-view from the monocular camera according to the depth map, and wherein generating the annotated image includes colorizing the objects in the field-of-view according to the distances including highlighting objects in the field-of-view that are within a distance threshold to the monocular camera.

14. The method of claim 10, wherein the additional cameras are retrofitted to different areas of the vehicle, and wherein estimating depth information of features in the additional images to output depth maps includes perceiving relative locations of the additional cameras with respect to the vehicle.

* * * * *